United States Patent
Jin et al.

(10) Patent No.: US 8,467,277 B2
(45) Date of Patent: Jun. 18, 2013

(54) OPTICAL RECORDING/REPRODUCING DEVICE AND METHOD OF CONTROLLING THE SAME

(75) Inventors: Jang Ho Jin, Hwaseong-si (KR); Young Jun Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 12/971,130

(22) Filed: Dec. 17, 2010

(65) Prior Publication Data

US 2011/0158064 A1 Jun. 30, 2011

(30) Foreign Application Priority Data

Dec. 24, 2009 (KR) .......................... 10-2009-130755

(51) Int. Cl.
*G11B 5/00* (2006.01)

(52) U.S. Cl.
USPC ..................................... 369/47.49; 369/47.38

(58) Field of Classification Search
USPC ............................................. 369/47.5, 47.49
See application file for complete search history.

(56) References Cited

U.S. PATENT DOCUMENTS

| | | | | |
|---|---|---|---|---|
| 5,768,222 A | * | 6/1998 | Hisamatsu et al. | 369/30.34 |
| 2004/0013053 A1 | | 1/2004 | Hong et al. | |
| 2004/0125706 A1 | * | 7/2004 | Jang | 369/30.14 |
| 2005/0078567 A1 | * | 4/2005 | Jang | 369/30.1 |
| 2005/0152245 A1 | * | 7/2005 | Kao et al. | 369/47.36 |
| 2005/0259539 A1 | * | 11/2005 | Takeda | 369/47.55 |

OTHER PUBLICATIONS

European Search Report issued Apr. 4, 2011 in EP Application No. 10194119.3.

* cited by examiner

*Primary Examiner* — Latanya Bibbins
(74) *Attorney, Agent, or Firm* — Stanzione & Kim, LLP

(57) ABSTRACT

An optical recording/reproducing device which minimizes the number of home-in operations to move a pickup to a predetermined reference position of a disc, and a method of controlling the same. The optical recording/reproducing device includes a pickup to record or reproduce information on or from a disc, a pickup movement motor to move the pickup along the disc, a main power supply controller to detect whether power is initially supplied so as to output a home-in control signal, and a drive controller to perform a home-in operation, only when power is initially supplied according to the home-in control signal of the main power supply controller. Since the home-in operation is performed only when power is initially supplied, the number of home-in operations is minimized.

11 Claims, 4 Drawing Sheets

OPTICAL RECORDING/REPRODUCING DEVICE AND METHOD OF CONTROLLING THE SAME

CROSS-REFERENCE TO RELATED APPLICATIONS

This application claims the benefit of Korean Patent Application No. 2009-0130755, filed on Dec. 24, 2009, in the Korean Intellectual Property Office, the disclosure of which is incorporated herein by reference in its entirety.

BACKGROUND

1. Field of the Invention

Embodiments of the present general inventive concept relate to an optical recording/reproducing device which minimizes the number of home-in operations to move a pickup to a predetermined reference position of an inner circumference of a disc, and a method of controlling the same.

2. Description of the Related Art

As video and audio media has been developed, discs to record and store High-Definition (HD) video information and high-quality audio information for a long period of time have been developed and made commercially available.

A disc is a recording medium on or from which information such as audio, video and text is recorded or reproduced by forming a large number of pits in a surface thereof so as to change reflection of a laser beam. Low-density discs such as Compact Discs (CDs) or Digital Versatile Discs (DVDs) were mainly used in the past. However, recently, as recording capacity of the low-density discs has reached an uppermost limit, new discs on which large information of several tens of gigabytes or more is recorded, such as high-density discs such as Blu-ray Disc (BD) Recordable/Rewritable or High-Density (HD) DVD, have been developed and are widely used.

An optical recording/reproducing device, to record information on such a disc or to reproduce recorded information, irradiates a laser beam from a pickup to the disc so as to record and/or reproduce information on and/or from the disc. In the optical recording/reproducing device, in order to record and/or reproduce the information on and/or from the disc, a home-in operation to enable a pickup movement motor to move the pickup to a predetermined reference position of an inner circumference of the disc is necessary. Examples of a method of detecting the reference position of the pickup in the home-in operation include a method of moving the pickup enough to collide with an innermost circumference (or an outermost circumference) of the disc, a method of detecting the pickup using a switch mounted in the innermost circumference (or the outermost circumference) of the disc, and the like. Since the pickup, the position of which is not known, is moved to the reference position in the home-in operation, about 2 to 3 seconds are required for performing the home-in operation by driving the pickup movement motor. The required time may be varied according to the configuration of the pickup movement motor or the position of the pickup.

In the optical recording/reproducing device of conventional systems, the home-in operation is performed whenever a tray is closed, a disc is inserted or power is turned on. Power to drive the pickup movement motor is consumed according to the number of home-in operations, and noise is generated whenever the pickup is moved enough to collide with the innermost circumference (or the outermost circumference) of the disc. Since the home-in operation is an initial operation of a loading operation of the disc for disc recognition, a time required for the home-in operation is included in a disc recognition time, and thus a loading time is increased.

SUMMARY

The present general inventive concept provides an optical recording/reproducing device which determines whether a condition to perform a home-in operation is satisfied and minimizes the number of home-in operations, and a method of controlling the same.

Additional features and utilities of the present general inventive concept will be set forth in part in the description which follows and, in part, will be obvious from the description, or may be learned by practice of the present general inventive concept.

Embodiments of the present general inventive concept provide an optical recording/reproducing device including: a pickup to record or reproduce information on or from a disc; a pickup movement motor to move the pickup along the disc; a main power supply controller to detect whether power is initially supplied to the optical recording/reproducing device so as to output a home-in control signal; and a drive control unit to perform a home-in operation to move the pickup to a predetermined reference position of the disc, only when power is initially supplied according to the home-in control signal of the main power supply controller.

The main power supply controller may determine a point of time when a power plug is connected so as to supply main power to the optical recording/reproducing device as a point of time when power is initially supplied to the optical recording/reproducing device.

The main power supply controller may output the home-in control signal so as to perform the home-in operation, when operation power of the optical recording/reproducing device is turned on according to a user command in a state in which power is initially supplied.

The main power supply controller may output the home-in control signal to move the pickup to the reference position, when operation power of the optical recording/reproducing device is turned off according to a user command after operation power of the optical recording/reproducing device is turned on according to a user command in a state in which power is initially supplied.

The drive control unit may adjust a driving torque of the pickup movement motor according to the home-in control signal of the main power supply controller.

The drive control unit may perform the home-in operation to increase the driving torque of the pickup movement motor so as to move the pickup to an innermost circumference or an outermost circumference of the disc, and to then move the pickup to the reference position, when power is initially supplied.

The drive control unit may decrease the driving torque of the pickup movement motor to be less than the driving torque of the home-in operation so as to directly move the pickup from a current position to the reference position.

Embodiments of the present general inventive concept also provide a method of controlling an optical recording/reproducing device including a pickup to record or reproduce information on or from a disc and a pickup movement motor to move the pickup, the method including: determining whether power is initially supplied or operation power is supplied to the optical recording/reproducing device; performing a home-in operation to increase driving torque of the pickup movement motor so as to move the pickup to a predetermined reference position of the disc, when power is initially supplied to the optical recording/reproducing device;

and decreasing the driving torque of the pickup movement motor to be less than a driving torque of the home-in operation so as to directly move the pickup from a current position to the reference position.

A point of time when power is initially supplied to the optical recording/reproducing device may be a point of time when a power plug is connected so as to supply main power to the optical recording/reproducing device.

A point of time when operation power is supplied to the optical recording/reproducing device may be a point of time when a user power-on/off command is input in a state in which power is initially supplied to the optical recording/reproducing device.

According to embodiments of the present general inventive concept, since determination as to whether a condition for performing the home-in operation is satisfied is made and the home-in operation is performed only when power is initially supplied to the optical recording/reproducing device, the number of home-in operations is minimized. Therefore, power consumption and noise which occurs in the home-in operation may be reduced and a disc loading time may be reduced.

Embodiments of the present general inventive concept also provide an optical recording/reproducing device including a pickup to record or reproduce information on or from a disc; a main power supply controller to detect whether power is initially supplied to the optical recording/reproducing device so as to output a home-in control signal; and a drive control unit to perform a home-in operation to move the pickup to a predetermined reference position of the disc according to the home-in control signal of the main power supply controller.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
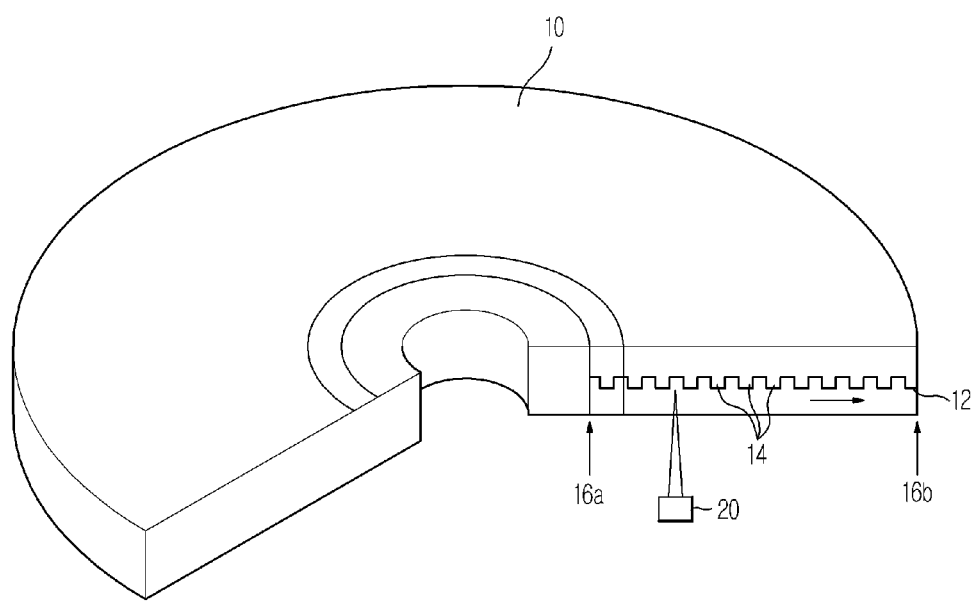
FIG. 1 is a cross-sectional view showing an example of a disc according to an embodiment of the present general inventive concept.

Reference will now be made in detail to the embodiments of the present general inventive concept, examples of which are illustrated in the accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a cross-sectional view showing an example of a disc according to an embodiment of the present general inventive concept.

In FIG. 1, the disc 10 is a storage medium having a layer 12 containing information and includes a low-density disc such as a Compact Disc (CD) or a Digital Versatile Disc (DVD) or a high-density disc such as a Blu-ray Disc (BD) or a High-Density (HD) DVD. A spiral track 14 on which information is recorded is formed in the layer 12 of the disc 10.

A laser beam is irradiated onto the track 14 of the disc 10 while a pickup 22 is moved from an inner circumference 16a to an outer circumference 16b of the disc 10 or vice versa, such that information is recorded onto the disc or recorded information is reproduced from the disc.

A read-in area is formed in the inner circumference 16a of the disc 10. When the pickup 22 initially accesses the disc 10, the pickup 22 is moved to a position accessible to the read-in area as a reference position. The position of the pickup 22 accessible to the read-in area is set to the reference position.

Figure 2:
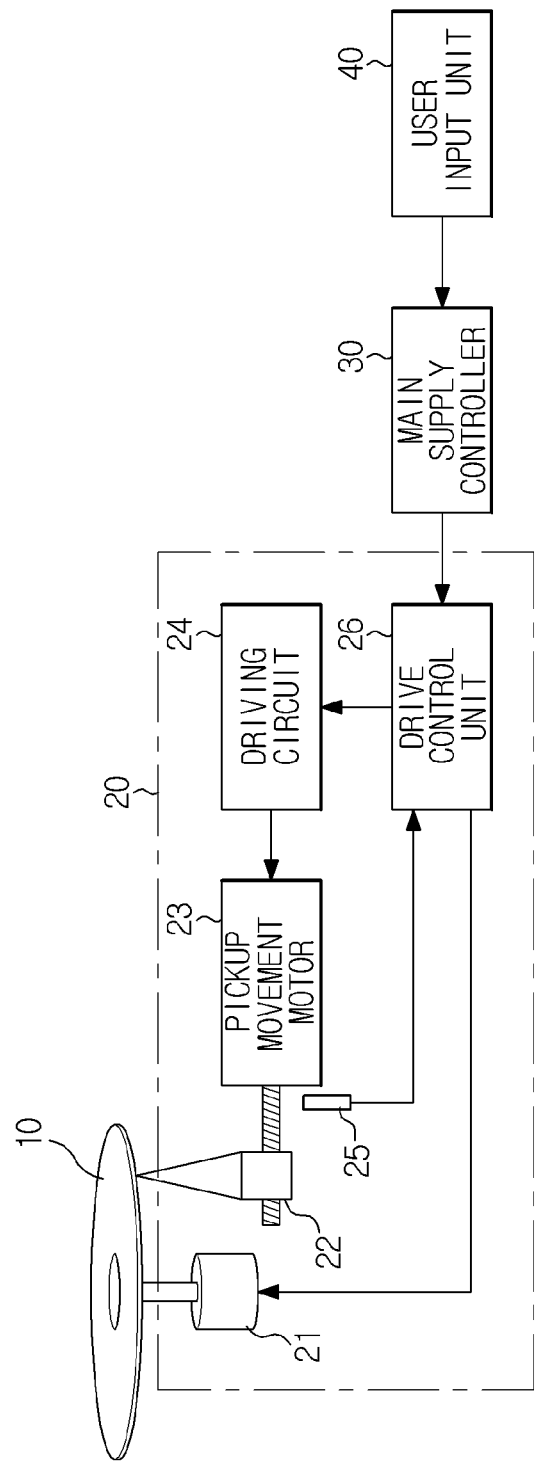
FIG. 2 is a block diagram showing the configuration of an optical recording/reproducing device according to an embodiment of the present general inventive concept.

FIG. 2 is a block diagram showing the configuration of an optical recording/reproducing device according to an embodiment of the present general inventive concept.

In FIG. 2, the optical recording/reproducing device according to an embodiment herein includes a disc drive unit 20 to drive the disc 10, a main power supply controller 30 to control power supply of the disc drive unit 20, and a user input unit 40 to input a user command to the main power supply controller 30.

The disc drive unit 20 includes a spindle motor 21 to rotate the disc 10 at a predetermined velocity, the pickup 22 to irradiate the laser beam emitted from a laser diode mounted therein to the disc 10 through an objective lens and to record and/or reproduce information, a pickup movement motor 23 to move the pickup 22 along the track of the disc 10, a driving circuit 24 to generate a drive signal to drive the pickup movement motor 23, a detection switch 25 to detect whether the pickup 22 is positioned at an innermost circumference of the disc 10, and a drive control unit 26 to control the overall operation of the disc drive unit 20, and to perform the home-in operation to move the pickup 22, the position of which on the disc 10 is not known, to the predetermined reference position of the inner circumference 16a of the disc 10.

The pickup movement motor 23 drives the pickup 22 in a stepwise manner to the inner circumference 16a or the outer circumference 16b of the disc 10 according to the drive signal generated by the driving circuit 24, so as to move the pickup 22 by a defined distance at a time.

The driving circuit 24 outputs pulses of the drive signal to the pickup movement motor 23 so as to drive the pickup movement motor 23 and counts the pulses so as to detect the position of the pickup 22. Accordingly, the drive control unit 26 computes the positional information of the pickup 22 using the driving circuit 24 so as to detect the current position of the pickup 22.

The drive control unit 26 controls the pickup 22 to be moved to the innermost circumference or the outermost circumference of the disc 10, when the optical recording/reproducing device is initialized. The drive control unit 26 receives the pulse of a home-in control signal from the main power supply controller 30 so as to perform the home-in operation.

The main power supply controller 30 detects a point of time when power is initially supplied to the optical recording/reproducing device, that is, a point of time when a power plug is connected so as to supply main power to an entire system, and a point of time when operation power of the optical recording/reproducing device is turned on/off according to a user command in a state in which the power plug is connected so as to supply the main power, and determines whether a condition to perform the home-in operation is satisfied. The main power supply controller 30 determines that the condition to perform the home-in operation is satisfied only when power is initially supplied to the optical recording/reproducing device, and outputs and transmits the pulse of the home-in control signal having a high level to the drive control unit 26. The drive control unit 26 receives the pulse of the home-in control signal having the high level from the main power supply controller 30 and performs the home-in operation to move the pickup 22, the position of which is not known, to the predetermined reference position of the inner circumference 16*a* of the disc 10.

The user input unit 40 inputs a command to request the operation power of the optical recording/reproducing device to be turned on/off to the main power supply controller 30 using a remote controller or a power button, in the state in which the power plug is connected so as to supply main power.

Hereinafter, the operation and the effects of the optical recording/reproducing device and the method of controlling the same according to some embodiments of the present general inventive concept will be described.

Figure 3:
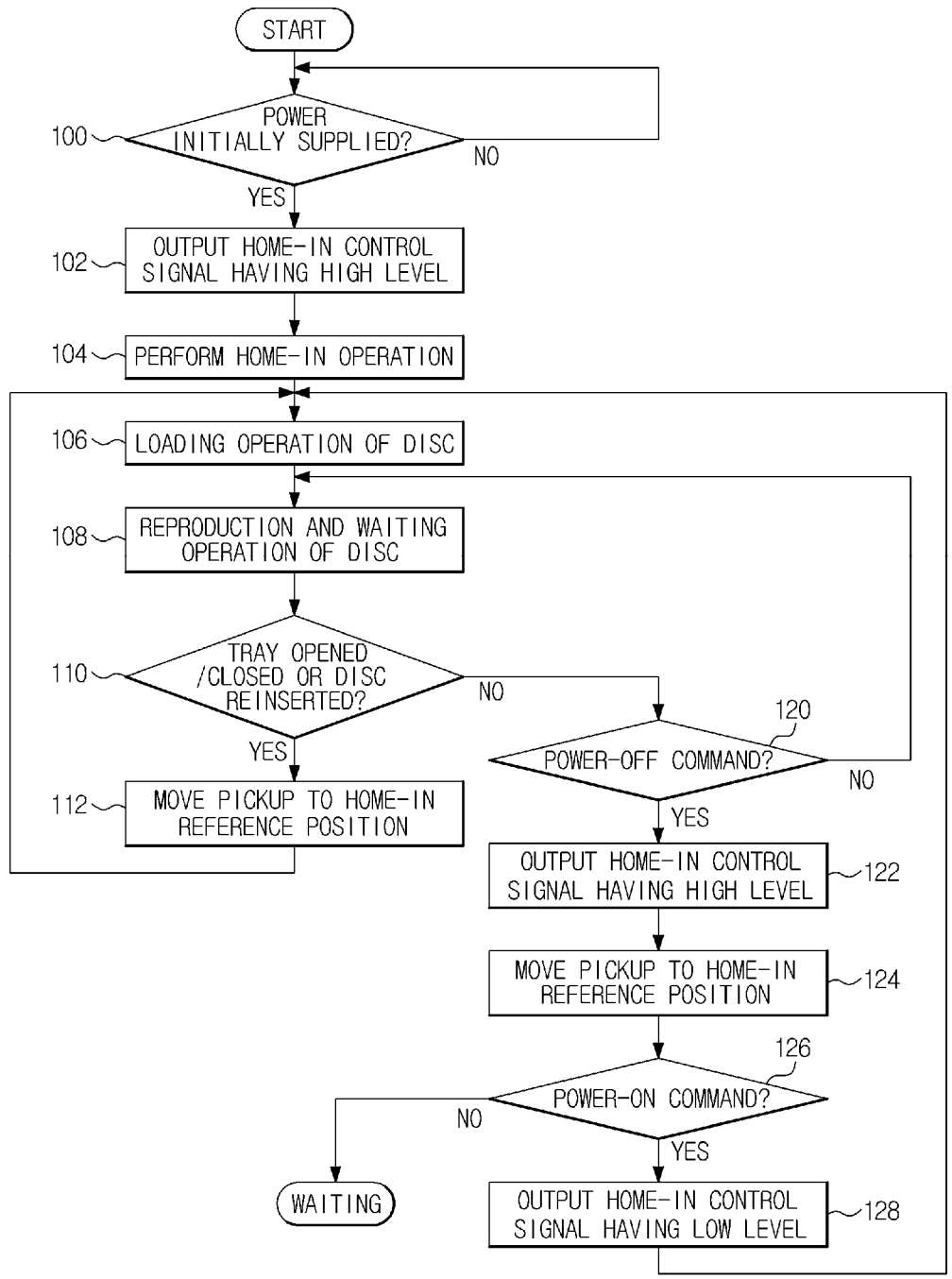
FIG. 3 is a flowchart illustrating a method of controlling an optical recording/reproducing device according to an embodiment of the present general inventive concept.
Figure 4:
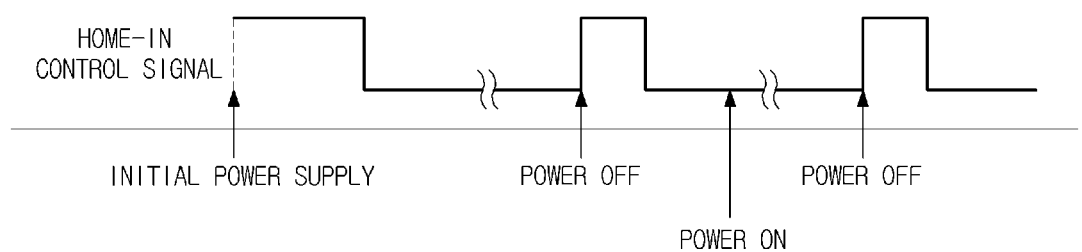
FIG. 4 is a waveform diagram of a home-in control signal to perform a home-in operation in an optical recording/reproducing device according to an embodiment of the present general inventive concept.

FIG. 3 is a flowchart illustrating a method of controlling an optical recording/reproducing device according to an embodiment of the present general inventive concept, and FIG. 4 is a waveform diagram of a home-in control signal to perform a home-in operation in an optical recording/reproducing device according to an embodiment of the present general inventive concept.

In FIG. 3, the main power supply controller 30 determines whether power is initially supplied to the optical recording/reproducing device, that is, whether the power plug is connected so as to supply main power to the entire system (operation 100), and outputs and transmits the pulse of the home-in control signal having the high level as shown in FIG. 4 to the drive control unit 26, when the power is initially supplied (operation 102).

Accordingly, the drive control unit 26 determines that power is initially supplied if the pulse of the home-in control signal having the high level is detected during a booting operation, and performs the home-in operation (operation 104).

The home-in operation refers to an operation to move the pickup 22, the position of which is not known, enough to reach the innermost circumference or the outermost circumference of the disc 10 and then to move the pickup to the predetermined reference position of the inner circumference 16*a* of the disc 10, by outputting the pulses of the drive signal from the drive controller 26 to the pickup movement motor 23 through the driving circuit 24 and driving the pickup movement motor 23 using high torque. The drive control unit 26 performs the home-in operation so as to find the reference position, only when power is initially supplied by the pulse of the home-in control signal having the high level received from the main power supply controller 30. Accordingly, since the home-in operation is performed only when power is initially supplied to the optical recording/reproducing device, the number of home-in operations can be minimized.

When the home-in operation is performed, the type of the disc 10 is determined and a loading operation of the disc 10, such as read-in information reproduction, is performed (operation 106).

When the loading operation of the disc 10 is performed, a general operation such as data recording or reproduction is performed according to a user command and a subsequent operation is awaited (operation 108).

While main power is supplied, that is, while the power plug is connected so as to supply main power to the optical recording/reproducing device, since the drive controller 26 computes and detects the current position of the pickup 22, it is determined whether a tray is opened/closed or the disc 10 is reinserted to require the loading operation of the disc 10 (operation 110).

If it is determined that the tray is opened/closed or the disc 10 is reinserted to require the loading operation of the disc 10 in Operation 110, the drive control unit 26 drives the pickup movement motor 23 using low torque so as to directly move the pickup 22 from the current position to the home-in reference position (operation 112). Subsequently, the method returns to Operation 106 so as to perform the loading operation of the disc 10.

If it is determined that the tray is not opened/closed or the disc 10 is not reinserted in Operation 110, the main power supply controller 30 determines whether a user power-off command is input from the user input unit 40 using the remote controller or the power button (operation 120).

If it is determined that the user power-off command is not input in Operation 120, the method returns to Operation 108 and the reproduction and waiting operation of the disc 10 is performed.

If it is determined that the user power-off command is input in Operation 120, the main power supply controller 30 outputs and transmits the pulse of the home-in control signal having the high level to the drive controller 26 (operation 122) as shown in FIG. 4, when the power of the optical recording/reproducing device is turned off by the power-off command of the user (operation 122).

When the operation power of the optical recording/reproducing device is turned off in the state in which the power plug is connected so as to supply main power, since the pulse of the home-in control signal having the high level is detected during the general operation such as the reproduction of the disc 10, the drive controller 26 determines that the operation power is turned off and drives the pickup movement motor 23 using low torque so as to move the pickup 22 from the current position to the home-in reference position (operation 124).

Since the device is infrequently moved and impacted while the power plug is connected, the position of the pickup 22 is infrequently changed while the operation power of the optical recording/reproducing device is turned off. Thus, the pickup 22 is directly moved from the current position to the home-in reference position.

Thereafter, the main power supply controller 30 determines whether a user power-on command is input from the user input unit 40 using the remote controller or the power button (operation 126).

If it is determined that the user power-on command is input in Operation 126, the main power supply controller 30 outputs and transmits the pulse of the home-in control signal having a low level to the drive control unit 26 as shown in FIG. 4, when the power of the disc drive unit 20 is turned on by the user power-on command (operation 128).

If the power plug is connected so as to supply main power and power is supplied to only the disc drive unit 20 such that the pulse of the home-in control signal having the low level is detected, the drive control unit 26 determines that the pickup 22 is positioned at the home-in reference position, and the method returns to Operation 106 so as to perform the loading operation of the disc 10.

If it is determined that the user power-on command is not input in Operation 126, the subsequent operation is awaited.

In general, the disc drive unit 20 to drive the disc 10 is divided into a tray type drive unit and a slot-loading type drive unit. The tray type drive unit performs the home-in operation when the tray is closed, and the slot-loading type drive unit performs the home-in operation when the disc 10 is inserted. Both the tray type drive unit and the slot-loading type drive unit perform the home-in operation even when power is turned on.

In the conventional device, the home-in operation is frequently performed regardless of the type of the disc drive unit 20 to drive the disc 10. Thus, power consumption and noise occurrence may be caused and a loading time may be increased.

Accordingly, in the optical recording/reproducing device according to embodiments of the present general inventive concept, since the home-in operation is performed only when power is initially supplied, power consumption, noise and the loading time is reduced.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. An optical recording/reproducing device comprising:
   a pickup to record or reproduce information on or from a disc;
   a pickup movement motor to move the pickup along the disc;
   a main power supply controller to detect whether power is initially supplied to the optical recording/reproducing device so as to output a home-in control signal; and
   a drive control unit, only when a power is initially supplied according to the home-in control signal of the main power supply controller, to move the pickup to the innermost circumference or the outermost circumference of the disc and then to move the pickup to a predetermined home-in reference position of the disc,
   wherein the drive control unit directly moves the pickup to the predetermined home-in reference position of the disc without moving the pickup to the innermost circumference of the outermost circumference of the disc when the power is turned off.

2. The optical recording/reproducing device according to claim 1, wherein the main power supply controller determines a point of time when the power plug is connected so as to supply main power to the optical recording/reproducing device as a point of time when power is initially supplied to the optical recording/reproducing device.

3. The optical recording/reproducing device according to claim 2, wherein the main power supply controller outputs the home-in control signal so as to move the pickup to a predetermined home-in reference position of the disc without moving the pickup to the innermost circumference or the outermost circumference of the disc when operation power of the optical recording/reproducing device is turned on according to a user command in a state in which power is initially supplied.

4. The optical recording/reproducing device according to claim 2, wherein the main power supply controller outputs the home-in control signal to move the pickup to the predetermined home-in reference position of the disc without moving the pickup to the innermost circumference or the outermost circumference of the disc, when operation power of the optical recording/reproducing device is turned off according to a user command after operation power of the optical recording/reproducing device is turned on according to a user command in a state in which power is initially supplied.

5. The optical recording/reproducing device according to claim 1, wherein the drive control unit adjusts driving torque of the pickup movement motor according to the home-in control signal of the main power supply controller.

6. The optical recording/reproducing device according to claim 5, wherein the drive control unit drives the pickup movement motor using high torque so as to move the pickup to an innermost circumference or an outermost circumference of the disc and to then move the pickup to the home-in reference position, when power is initially supplied.

7. The optical recording/reproducing device according to claim 6, wherein the drive control unit drives the pickup movement motor using low torque so as to directly move the pickup from a current position to the home-in reference position.

8. A method of controlling an optical recording/reproducing device including a pickup to record or reproduce information on or from a disc and a pickup movement motor to move the pickup, the method comprising:
   determining whether power is initially supplied to the optical recording/reproducing device or whether the power is turned off;
   driving the pickup movement motor using high torque, when the power is determined to be initially supplied to the optical recording/reproducing device, so as to move the pickup to the innermost circumference or the outermost circumference of the disc and then to move the pickup to a predetermined home-in reference position of the disc; and
   driving the pickup movement motor using low torque so as to directly move the pickup from a current position to the home-in reference position without moving the pickup to the innermost circumference of the outermost circumference of the disc when the power is turned off.

9. The method according to claim 8, wherein a point of time when power is initially supplied to the optical recording/reproducing device is a point of time when the power plug is connected so as to supply main power to the optical recording/reproducing device.

10. The method according to claim 8, wherein a point of time when operation power is supplied to the optical recording/reproducing device is a point of time when a user power-on/off command is input in a state in which power is initially supplied to the optical recording/reproducing device.

11. An optical recording/reproducing device comprising:
    a pickup to record or reproduce information on or from a disc;
    a main power supply controller to detect whether power is initially supplied to the optical recording/reproducing device via a power plug or whether the power is turned off, so as to output a home-in control signal; and
    a drive control unit to move the pickup to a predetermined reference position of the disc according to the home-in control signal of the main power supply controller, such that the main power supply controller outputs the home-in control signal to move the pickup to the home-in reference position when the operation power is initially supplied to the optical recording/reproducing device or when the optical recording/reproducing device is turned off according to a user command, and the drive control unit adjusts driving torque of a pickup movement motor of the pickup according to the home-in control signal of the main power supply controller.

* * * * *